United States Patent
Deng et al.

(10) Patent No.: US 10,478,028 B2
(45) Date of Patent: *Nov. 19, 2019

(54) RECHARGEABLE VACUUM CLEANER ASSEMBLY

(71) Applicant: JIANGSU MIDEA CLEANING APPLIANCES CO., LTD., Suzhou (CN)

(72) Inventors: Chaoyi Deng, Suzhou (CN); Min Zhong, Suzhou (CN); Xinzhou Wang, Suzhou (CN); Yonghua Wang, Suzhou (CN)

(73) Assignee: JIANGSU MIDEA CLEANING APPLIANCES CO. LTD., Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/539,153

(22) PCT Filed: Mar. 22, 2016

(86) PCT No.: PCT/CN2016/077002
§ 371 (c)(1),
(2) Date: Jun. 23, 2017

(87) PCT Pub. No.: WO2017/124625
PCT Pub. Date: Jul. 27, 2017

(65) Prior Publication Data
US 2018/0333018 A1   Nov. 22, 2018

(30) Foreign Application Priority Data

Jan. 20, 2016 (CN) .......................... 2016 1 0036807
Jan. 20, 2016 (CN) .......................... 2016 1 0036808

(Continued)

(51) Int. Cl.
*A47L 5/12* (2006.01)
*A47L 9/28* (2006.01)
(Continued)

(52) U.S. Cl.
CPC . *A47L 5/12* (2013.01); *A47L 9/26* (2013.01); *A47L 9/28* (2013.01); *A47L 9/2873* (2013.01); *A47L 9/2889* (2013.01); *H02J 7/0042* (2013.01)

(58) Field of Classification Search
CPC . A47L 9/2873; A47L 9/26; A47L 9/28; A47L 9/2889; H02J 7/0042
(Continued)

(56) References Cited

U.S. PATENT DOCUMENTS 3,711,742 A * 1/1973 Pinkham, Jr. ............ A47L 9/246
174/5 SG
4,920,608 A * 5/1990 Hult ........................ A47L 5/24
15/339

(Continued)

FOREIGN PATENT DOCUMENTS

CN   101184425 A   5/2008
CN   201431418 Y   3/2010
(Continued)

OTHER PUBLICATIONS

Translation of DE102007036228, retrieved from Espacenet on May 22, 2019 (Year: 2009).*
(Continued)

*Primary Examiner* — Sean K. Hunter
*Assistant Examiner* — Thomas Raymond Rodgers
(74) *Attorney, Agent, or Firm* — Kilpatrick Townsend & Stockton, LLP

(57) ABSTRACT

A rechargeable vacuum cleaner assembly includes: a rechargeable vacuum cleaner provided with a first magnetic
(Continued)

member (1011); and a charging stand (100) provided with a second magnetic member (1012), in which the first magnetic member (1011) is configured to cooperate with the second magnetic member (1012) through magnetic attraction so as to position the rechargeable vacuum cleaner to the charging stand (100).

18 Claims, 13 Drawing Sheets

(30) Foreign Application Priority Data

| Jan. 20, 2016 | (CN) | 2016 1 0036810 |
|---|---|---|
| Jan. 20, 2016 | (CN) | 2016 1 0037447 |
| Jan. 20, 2016 | (CN) | 2016 1 0037459 |
| Jan. 20, 2016 | (CN) | 2016 1 0037564 |
| Jan. 20, 2016 | (CN) | 2016 1 0037607 |
| Jan. 20, 2016 | (CN) | 2016 2 0053968 U |
| Jan. 20, 2016 | (CN) | 2016 2 0054592 U |
| Jan. 20, 2016 | (CN) | 2016 2 0054593 U |
| Jan. 20, 2016 | (CN) | 2016 2 0054761 U |
| Jan. 20, 2016 | (CN) | 2016 2 0054838 U |
| Jan. 20, 2016 | (CN) | 2016 2 0054864 U |
| Jan. 20, 2016 | (CN) | 2016 2 0054926 U |
| Jan. 20, 2016 | (CN) | 2016 2 0054929 U |

(51) Int. Cl.
*H02J 7/00* (2006.01)
*A47L 9/26* (2006.01)

(58) Field of Classification Search
USPC .............................................................. 15/339
See application file for complete search history.

(56) References Cited

U.S. PATENT DOCUMENTS

| 5,923,146 | A * | 7/1999 | Martensson | H01R 13/6675 |
|---|---|---|---|---|
| | | | | 320/111 |
| 5,926,909 | A * | 7/1999 | McGee | A47L 5/24 |
| | | | | 15/339 |
| 6,170,119 | B1 * | 1/2001 | Conrad | A47L 5/22 |
| | | | | 15/339 |
| 7,389,166 | B2 * | 6/2008 | Harwig | G05D 1/0272 |
| | | | | 15/300.1 |
| 8,127,397 | B2 * | 3/2012 | Hess | A47L 5/365 |
| | | | | 15/323 |
| 8,572,799 | B2 * | 11/2013 | Won | A47L 9/106 |
| | | | | 15/319 |
| 9,314,140 | B2 * | 4/2016 | Eriksson | A47L 9/02 |
| 2007/0017063 | A1 | 1/2007 | Park et al. | |
| 2013/0152336 | A1 | 6/2013 | Courtney | |
| 2014/0143978 | A1 | 5/2014 | Li et al. | |
| 2014/0366300 | A1 * | 12/2014 | Eriksson | A47L 9/00 |
| | | | | 15/246.2 |
| 2016/0015233 | A1 * | 1/2016 | Uphoff | A47L 9/0606 |
| | | | | 134/6 |
| 2017/0100007 | A1 * | 4/2017 | Matsumoto | A47L 9/00 |

FOREIGN PATENT DOCUMENTS

| CN | 102894628 A | | 1/2013 | | |
|---|---|---|---|---|---|
| CN | 103006153 A | | 4/2013 | | |
| CN | 103505152 A | | 1/2014 | | |
| CN | 203619467 U | | 6/2014 | | |
| CN | 203827853 U | | 9/2014 | | |
| CN | 104080384 A | | 10/2014 | | |
| CN | 104132412 A | | 11/2014 | | |
| CN | 205458450 U | | 8/2016 | | |
| CN | 205514367 A | | 8/2016 | | |
| CN | 205514380 U | | 8/2016 | | |
| CN | 205514399 U | | 8/2016 | | |
| CN | 205514400 U | | 8/2016 | | |
| CN | 205514401 U | | 8/2016 | | |
| CN | 205649469 U | | 10/2016 | | |
| DE | 102007036228 A1 | * | 2/2009 | ........... | A47L 9/2852 |
| DE | 102007036228 B4 | | 2/2009 | | |
| JP | 2006136503 A | | 6/2006 | | |
| KR | 101297194 B1 | | 8/2013 | | |
| WO | 2013113395 A1 | | 8/2013 | | |

OTHER PUBLICATIONS

The CN First Office Action dated Jul. 27, 2017 in the corresponding Chinese application (application No. 201610036807.X).
The CN First Office Action dated Jul. 31, 2017 in the corresponding Chinese application (application No. 201610036808.4).
The CN First Office Action dated Aug. 1, 2017 in the corresponding Chinese application (application No. 201610036810.1).
The CN First Office Action dated Jul. 31, 2017 in the corresponding Chinese application (application No. 201610037447.5).
The CN First Office Action dated Jul. 24, 2017 in the corresponding Chinese application (application No. 201610037459.8).
The CN First Office Action dated Jul. 31, 2017 in the corresponding Chinese application (application No. 201610037564.1).
The CN First Office Action dated Jul. 28, 2017 in the corresponding Chinese application (application No. 201610037607.6).

* cited by examiner

RECHARGEABLE VACUUM CLEANER ASSEMBLY

CROSS REFERENCE TO RELATED APPLICATION

The present application is a National Stage of International Application No. PCT/CN2016/077002, filed Mar. 22, 2016, which claims the priority and benefit of Chinese Patent Application No. 201610036807.X, 201620054593.4, 201610037564.1, 201620054929.7, 201610036808.4, 201620054838.3, 201610036810.1, 201620054864.6, 201610037447.5, 201620054592.X, 201620054926.3, 201610037459.8, 201620054761.X, 201610037607.6 and 201620053968.5, all filed on Jan. 20, 2016, the contents of which are incorporated herein by reference in their entirety.

FIELD

The present disclosure relates to a technical field of vacuum cleaners, and more particularly to a rechargeable vacuum cleaner assembly.

BACKGROUND

In the related art, some rechargeable vacuum cleaners are equipped with a charging stand; the charging stand is provided with a guide rib; the vacuum cleaner defines a groove; when the groove is aligned with the guide rib, the vacuum cleaner may be guided to a specific position on the charging stand so as to be charged. However, it is not easy to align the groove with the guide rib, resulting in a low charging efficiency.

SUMMARY

The present disclosure seeks to solve at least one of the problems existing in the related art to at least some extent. An objective of the present disclosure is to provide a rechargeable vacuum cleaner assembly that has a high charging efficiency.

The rechargeable vacuum cleaner assembly according to the present disclosure includes: a rechargeable vacuum cleaner provided with a first magnetic member; and a charging stand provided with a second magnetic member, in which the first magnetic member is configured to cooperate with the second magnetic member through magnetic attraction so as to position the rechargeable vacuum cleaner to the charging stand.

For the rechargeable vacuum cleaner assembly according to the present disclosure, by providing the rechargeable vacuum cleaner assembly with the first magnetic member and the second magnetic member in cooperation with each other, the rechargeable vacuum cleaner may be positioned to the charging stand fast and accurately, thus lowering the difficulty of positioning the rechargeable vacuum cleaner and improving the charging efficiency.

In an example according to the present disclosure, the first magnetic member and the second magnetic member both are magnets.

In an example according to the present disclosure, one of the first magnetic member and the second magnetic member is a magnet, and the other thereof is an iron member.

In an example according to the present disclosure, the rechargeable vacuum cleaner assembly further includes a pedal disposed on the body and pivotable between a first position and a second position.

In an example according to the present disclosure, the rechargeable vacuum cleaner assembly further includes a safety protection device disposed on the body and normally engaged with the pedal, in which when the safety protection device is toggled, the safety protection device is disengaged from the pedal to make the pedal move from the first position to the second position.

In an example according to the present disclosure, at least two safety protection devices are provided; the at least two safety protection devices are disposed on the body and spaced apart from each other; when the at least two safety protection devices are toggled, the at least two safety protection devices are disengaged from the pedal to make the pedal move from the first position to the second position.

In an example according to the present disclosure, each safety protection device includes: a safety protection member disposed at a side face of the pedal and defining an fitting groove in which an edge of the pedal is fitted; and a resetting member disposed between the safety protection member and the body, and configured to normally push the safety protection member towards a center of the pedal.

In an example according to the present disclosure, the safety protection member is pivotably connected to the body; the safety protection member has a first end and a second end, in which the fitting groove is defined in the second end of the safety protection member; when the first end of the safety protection member is toggled, the second end of the safety protection member moves away from the center of the pedal to disengage the edge of the pedal from the fitting groove.

In an example according to the present disclosure, the first end of the safety protection member has a guide surface configured to toggle the first end of the safety protection member.

In an example according to the present disclosure, the guide surface is constructed to extend obliquely towards the center of the pedal from up to down.

In an example according to the present disclosure, the guide surface is formed as an oblique plane or an oblique curved surface, extending obliquely towards the center of the pedal from up to down.

In an example according to the present disclosure, when the pedal is in the first position, the first end of the safety protection member extends out of an inner side face of the body.

In an example according to the present disclosure, the resetting member is configured as an elastic sheet or a spring.

In an example according to the present disclosure, two safety protection devices are provided and located at a left side and a right side of the body respectively.

In an example according to the present disclosure, the pedal is disposed horizontally when in the first position.

In an example according to the present disclosure, a rotation angle of the pedal 2 rotating from the first position to the second position is denoted as a, in which $\alpha$ satisfies $0° < \alpha \leq 60°$.

In an example according to the present disclosure, $\alpha$ further satisfies $1° \leq \alpha \leq 10°$.

In an example according to the present disclosure, a top of the body is open; the pedal is disposed within the body and spaced apart from a bottom wall of the body.

In an example according to the present disclosure, a lower surface of the pedal is provided with at least one reinforcing rib.

In an example according to the present disclosure, a blade is provided in the body, and an opening is defined in the pedal and corresponds to a position of the blade; when the pedal is in the second position, the blade extends out of the opening to cut off hairs around a brushroll of the vacuum cleaner placed on the pedal; when the pedal is in the first position, the blade is located below the opening.

In an example according to the present disclosure, the charging stand for the vacuum cleaner further includes a microswitch disposed within the body, in which when the pedal is in the second position, the microswitch is triggered to make the charging stand stop charging and rotate the brushroll.

In an example according to the present disclosure, the blade is vertically disposed.

In an example according to the present disclosure, the blade extends curvedly along a length direction thereof.

In an example according to the present disclosure, the blade extends in an arc or wavy manner along the length direction thereof.

In an example according to the present disclosure, the body has a base, and an elastic member is disposed between the blade and the base.

In an example according to the present disclosure, the rechargeable vacuum cleaner assembly further includes a blade holder disposed on the base, in which the blade is disposed on the blade holder; the elastic member is disposed between the blade and the blade holder and/or between the blade holder and the base.

In an example according to the present disclosure, when the elastic member is disposed between the blade holder and the base, an accommodating groove is defined in the base and configured to accommodate the elastic member.

In an example according to the present disclosure, an upper surface of the elastic member is higher than an upper surface of the base.

In an example according to the present disclosure, the elastic member is made of soft rubber.

In an example according to the present disclosure, the pedal is provided with a stopping piece, and the opening is defined in the stopping piece.

In an example according to the present disclosure, the stopping piece is horizontally disposed.

In an example according to the present disclosure, a clearance groove is defined in a lower surface of a part, adjacent to the opening, of the stopping piece.

In an example according to the present disclosure, a distance between an inner wall of the clearance groove and an upper surface of the stopping piece is gradually decreased in a direction towards a center of the opening.

In an example according to the present disclosure, the stopping piece is made of soft rubber.

In an example according to the present disclosure, the pedal has a first end and a second end, and the first end of the pedal is pivotably connected to the body through a pivot shaft; an elastic resetting member is provided between the second end of the pedal and the body, and configured to normally push the pedal towards the first position.

In an example according to the present disclosure, a side of the body adjacent to the second end of the pedal is provided with a position-limiting member, and the position-limiting member is located at a side of the pedal away from the elastic resetting member.

In an example according to the present disclosure, the elastic resetting member is configured as a spring.

In an example according to the present disclosure, the pedal extends along a front-rear direction; the first end of the pedal is a rear end thereof, and the second end of the pedal is a front end thereof.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of the present disclosure will become apparent and more readily appreciated from the following descriptions of embodiments made with reference to the drawings, in which.

Figure 1:
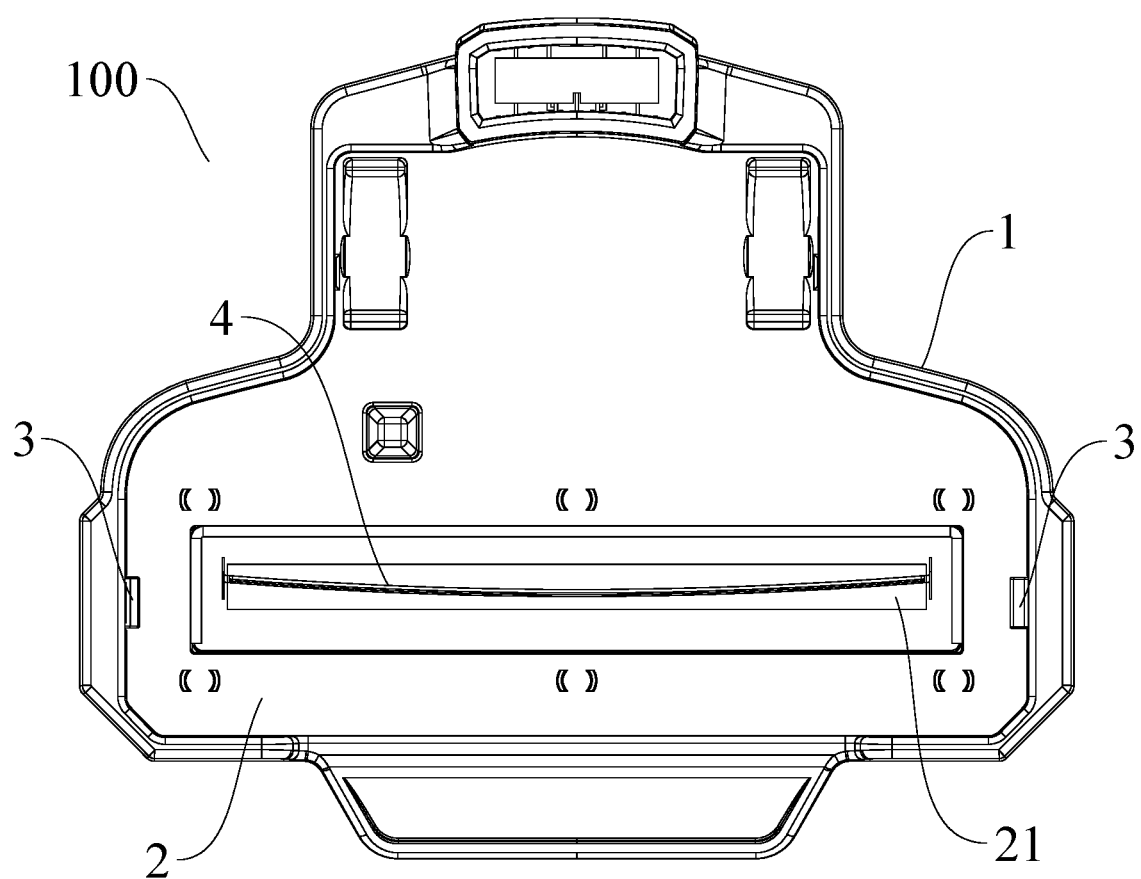
FIG. 1 is a top view of a charging stand according to an embodiment of the present disclosure.

REFERENCE NUMERALS 100 charging stand;
1 body; 11 base; 111 accommodating groove;
2 pedal; 21 opening; 22 pivot shaft; 23 elastic resetting member; 24 position-limiting member; 25 reinforcing rib; 26 stopping piece; 261 clearance groove;
3 safety protection device; 31 safety protection member; 311 fitting groove; 32 resetting member;
4 blade; 41 blade holder; 42 elastic member;

5 microswitch;
1011 first magnetic member; 1012 second magnetic member;
200 vacuum cleaner; 201 brushroll; 202 brushroll boss.

DETAILED DESCRIPTION

Reference will be made in detail to embodiments of the present disclosure. Examples of the embodiments are shown in the drawings. The same or similar elements and the elements having same or similar functions are denoted by like reference numerals throughout the descriptions. The embodiments described herein with reference to drawings are explanatory, and used to illustrate the present disclosure. The embodiments shall not be construed to limit the present disclosure.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientations or positions as described or as shown in the drawings under discussion. These relative terms are for convenience of description and do not indicate or imply that the device or element referred to must have a particular orientation or be constructed or operated in a particular orientation. Thus, the relative terms shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the description of the present disclosure, it should be understood that, unless specified or limited otherwise, the terms "mounted," "connected," and "coupled" are interpreted broadly and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the following, a rechargeable vacuum cleaner assembly according to embodiments of the present disclosure will be described with reference to FIGS. 1 to 18.

Figure 17:
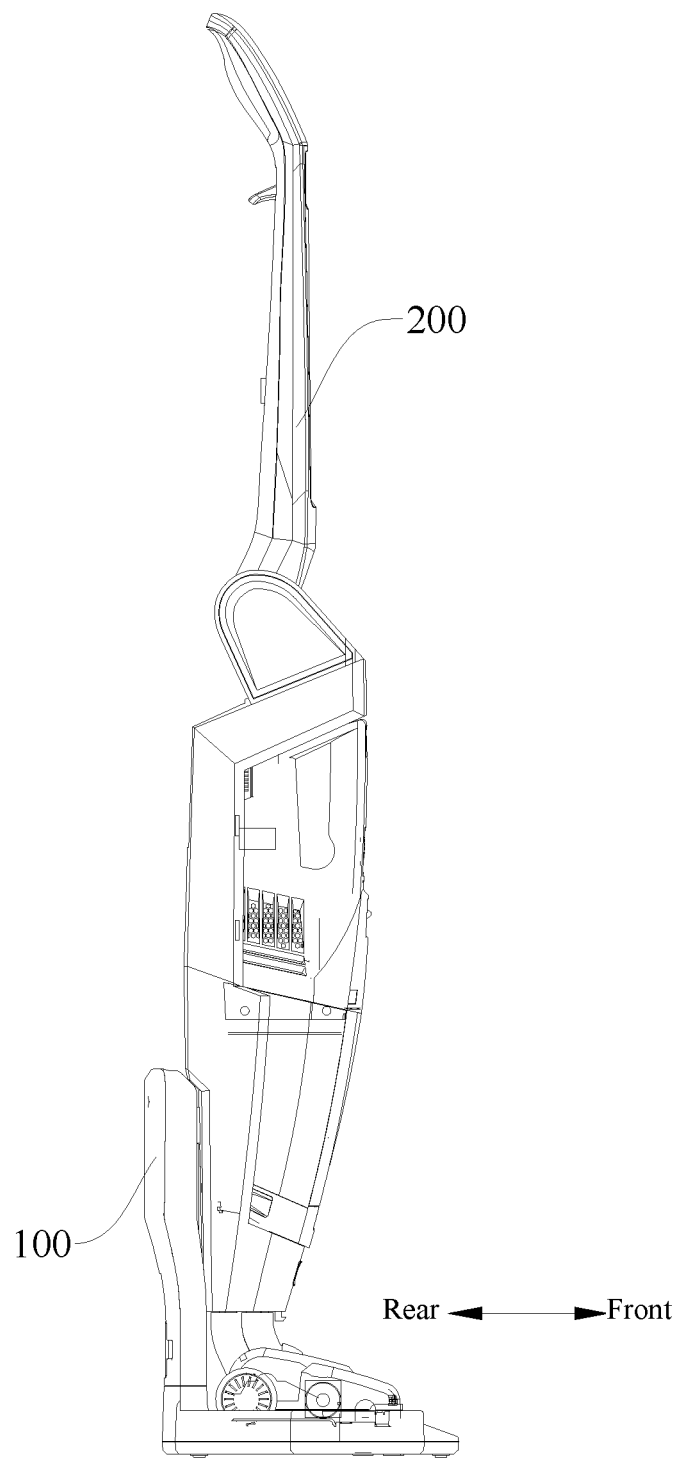
FIG. 17 is a schematic view of a rechargeable vacuum cleaner assembly according to an embodiment of the present disclosure.
Figure 18:
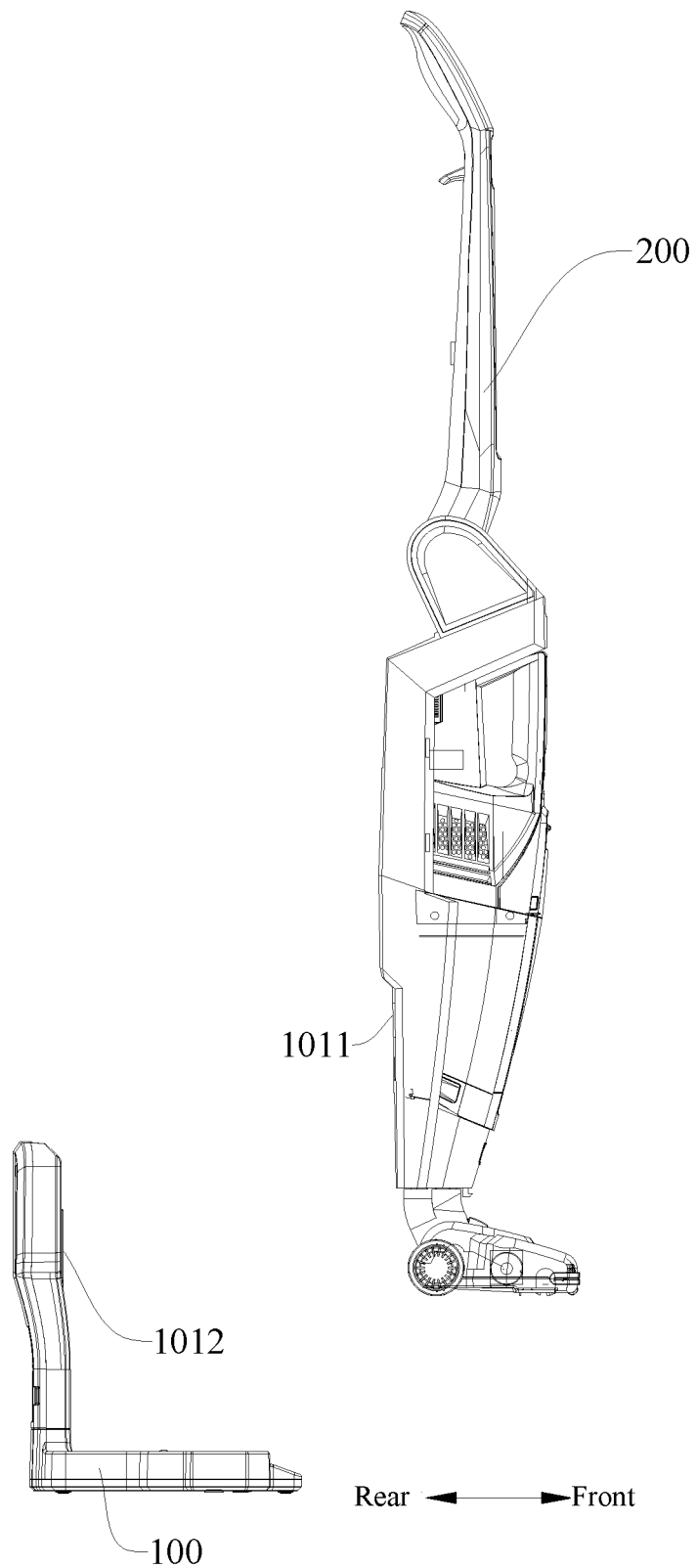
FIG. 18 is an exploded view of the rechargeable vacuum cleaner assembly shown in FIG. 17.

As shown in FIGS. 17 and 18, the rechargeable vacuum cleaner assembly according to embodiments of the present disclosure includes a rechargeable vacuum cleaner and a charging stand 100. The charging stand 100 may charge the rechargeable vacuum cleaner.

The rechargeable vacuum cleaner is provided with a first magnetic member 1011, and the charging stand 100 is provided with a second magnetic member 1012, in which the first magnetic member 1011 is configured to cooperate with the second magnetic member 1012 through magnetic attraction so as to position the rechargeable vacuum cleaner to the charging stand 100, thereby charging the rechargeable vacuum cleaner.

Figure 2:
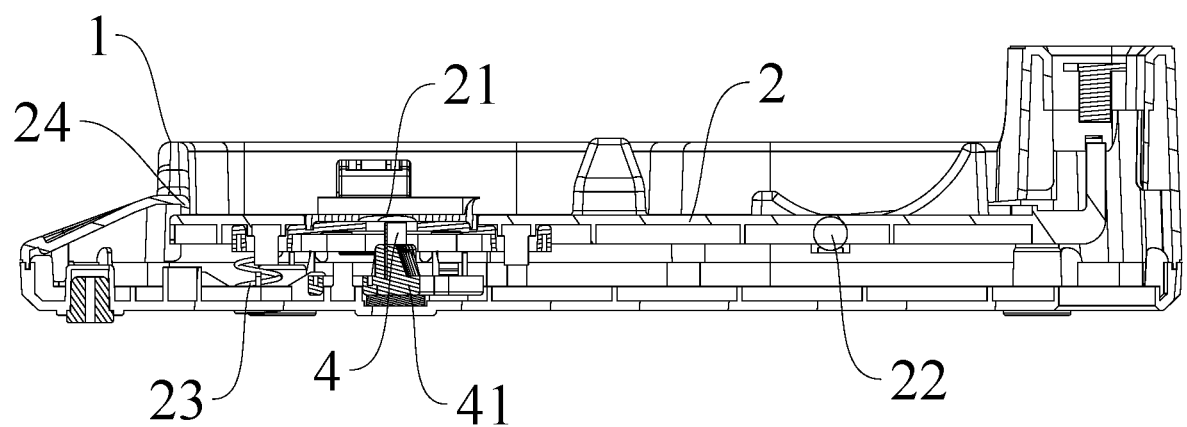
FIG. 2 is a longitudinal sectional view of the charging stand according to the embodiment of the present disclosure, in which a pedal is located in a first position.

For example, referring to FIG. 2, the first magnetic member 1011 is disposed a rear side of the rechargeable vacuum cleaner and located at a lower portion of the rechargeable vacuum cleaner. The second magnetic member 1012 is disposed on the charging stand 100 and located at a position opposite the first magnetic member 1011. For example, the second magnetic member 1012 may be disposed to a body 1 of the charging stand 100. Therefore, the first magnetic member 1011 and the second magnetic member 1012 may cooperate conveniently through magnetic attraction, such that the rechargeable vacuum cleaner may be positioned to the charging stand 100 fast and accurately, so as to be charged, which lowers the difficulty of positioning the rechargeable vacuum cleaner and improves the charging efficiency. It should be noted herein that the direction "front" refers to a direction of the charging stand 100 close to a user, and the direction "rear" refers to an opposite direction.

For example, when the rechargeable vacuum cleaner needs to be charged, it is only need to make the first magnetic member 1011 of the rechargeable vacuum cleaner approach the second magnetic member 1012 on the charging stand 100, such that the first magnetic member 1011 of the rechargeable vacuum cleaner cooperates with the second magnetic member 1012 on the charging stand 100 through magnetic attraction, thereby guiding the rechargeable vacuum cleaner to a charging position on the charging stand 100 so as to charge the rechargeable vacuum cleaner. Thus, the difficulty of positioning the rechargeable vacuum cleaner is lowered, which brings great convenience to the user.

For the rechargeable vacuum cleaner assembly according to the present disclosure, by providing the rechargeable vacuum cleaner assembly with the first magnetic member 1011 and the second magnetic member 1012 in cooperation with each other, the rechargeable vacuum cleaner may be positioned to the charging stand 100 fast and accurately, thus lowering the difficulty of positioning the rechargeable vacuum cleaner and improving the charging efficiency.

In some embodiments according to the present disclosure, the first magnetic member 1011 and the second magnetic member 1012 both are magnets. The magnetic attraction of the magnet is strong and the cost thereof is low, thereby reducing the material cost of the rechargeable vacuum cleaner assembly.

In some other embodiments according to the present disclosure, one of the first magnetic member 1011 and the second magnetic member 1012 is a magnet, and the other thereof is an iron member. That is, when the first magnetic member 1011 is a magnet, the second magnetic member 1012 is an iron member; when the first magnetic member 1011 is an iron member, the second magnetic member 1012 is a magnet. Thus, it is also possible to achieve fast and accurate positioning of the rechargeable vacuum cleaner to the charging stand 100 and further reduce the material cost of the rechargeable vacuum cleaner assembly.

As shown in FIGS. 1-16, the rechargeable vacuum cleaner assembly according to embodiments of the present disclosure further includes a pedal 2 and a safety protection device 3. Specifically, a blade 4 is provided in the body 1 and is configured to cut off hairs or the like around a brushroll 201 of the vacuum cleaner 200 placed on the charging stand 100. In such a case, the charging stand 100 not only has a charging function but also is able to clear off hairs or the like wound around the brushroll 201, thereby expanding the functionality of the charging stand 100, facilitating the cleaning of the brushroll 201, and simplifying a cleaning process of the brushroll 201. It should be noted herein that when a cleaning function of the charging stand 100 is applied, the vacuum cleaner 200 may be configured as a rechargeable vacuum cleaner or other types of vacuum cleaners.

Figure 3:
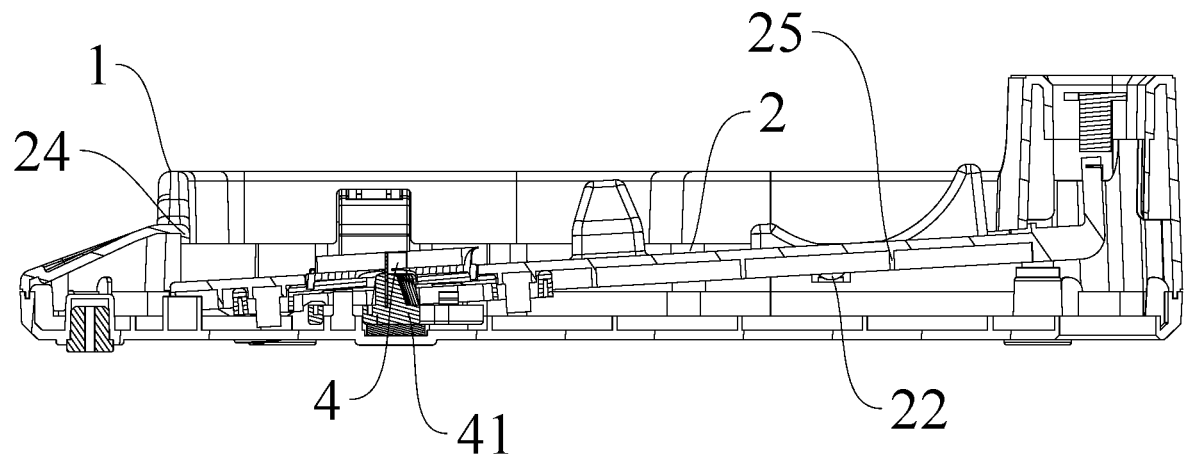
FIG. 3 is a longitudinal sectional view of the charging stand according to the embodiment of the present disclosure, in which the pedal is located in a second position.

The pedal 2 is provided on the body 1 and is pivotable between a first position and a second position. An opening 21 is defined in the pedal and corresponds to the position of the blade 4. When the pedal 2 is in the first position, the blade 4 is located below the opening 21 (as shown in FIG. 2); when the pedal 2 is in the second position, the blade 4 extends out of the opening 21 (as shown in FIG. 3). When the pedal 2 is in the first position, the blade 4 is received in the body and is not exposed from the opening 21. At this time, the rechargeable vacuum cleaner can be placed on the charging stand 100 to be charged, and the safety is guaranteed when the charging stand 100 is in use. When the pedal 2 is in the second position, the blade 4 extends out of the opening 21. At this time, the vacuum cleaner 200 is actuated to rotate the brushroll 201, such that the blade 4 may cut off hairs or the like wound around the brushroll 201 effectively.

One safety protection device 3 may be provided, or a plurality of safety protection devices 3 may be provided. When there is one safety protection device 3, the safety protection device 3 is disposed on the body 1 and normally engaged with the pedal 2. When the safety protection device 3 is toggled, the safety protection device 3 is disengaged from the pedal 2 to make the pedal 2 move from the first position to the second position.

When there are a plurality of safety protection devices 3, at least two safety protection devices 3 are disposed on the body 1 and spaced apart from each other, and each safety protection device 3 is normally engaged with the pedal 2. When the at least two safety protection devices 3 are toggled, the at least two safety protection devices 3 are disengaged from the pedal 2 to make the pedal 2 move from the first position to the second position. In normal situations, the safety protection devices 3 are engaged with the pedal 2 to keep the pedal 2 in the first position, that is, the blade 4 is located within the body 1, which may effectively prevent a safety risk that the user may be injured because the pedal 2 directly moves to the second position with the blade 4 exposed. Moreover, when the hairs around the brushroll 201 need to be cut off, all the safety protection devices 3 need to be toggled at the same time to make them disengage from the pedal 2, such that the pedal 2 is released and then is rotated to the second position to expose the blade 4, thereby cutting off the hairs around the brushroll 201. In this process, if only some of the safety protection devices 3 are toggled, the pedal 2 cannot move to the second position, thus further ensuring the security of the user.

For the charging stand 100 according to embodiments of the present disclosure, with the blade 4 in the body 1, the functionality of the charging stand 100 is expanded, and with the pivotable pedal 2 and the at least two safety protection devices 3, the safety may be effectively guaranteed during operation of the charging stand 100.

In an embodiment of the present disclosure, the pedal 2 is disposed horizontally when in the first position, as shown in FIG. 2, such that the overall appearance of the charging stand 100 is aesthetic, and the rechargeable vacuum cleaner may be horizontally placed on the pedal 2 when charged. When the pedal 2 is in the second position, a front end of the pedal 2 is located at a lower height compared with the front end in the first position, as shown in FIG. 3. That is, the pedal 2 can move to the second position as long as the pedal 2 is stepped down, which brings great convenience to the user. It should be noted herein that the direction "front" refers to the direction of the charging stand 100 close to the user, and the direction "rear" refers to the opposite direction.

A rotation angle of the pedal 2 rotating from the first position to the second position is denoted as a, in which a satisfies $0°<\alpha\leq 60°$. For example, a may be 30°. Further, α further satisfies $1°\leq\alpha\leq 10°$. For example, a may be 3° or 5°. It could be understood that a specific value of α may be varied adaptively in the light of practical requirements, which will not be defined particularly.

When the pedal 2 is in the first position, an upper end of the blade 4 is preferably lower than a lower surface of the pedal 2, and certainly, the upper end of the blade 4 may be higher than the lower surface of the pedal 2 but lower than an upper surface (not shown) of the pedal 2.

Figure 7:
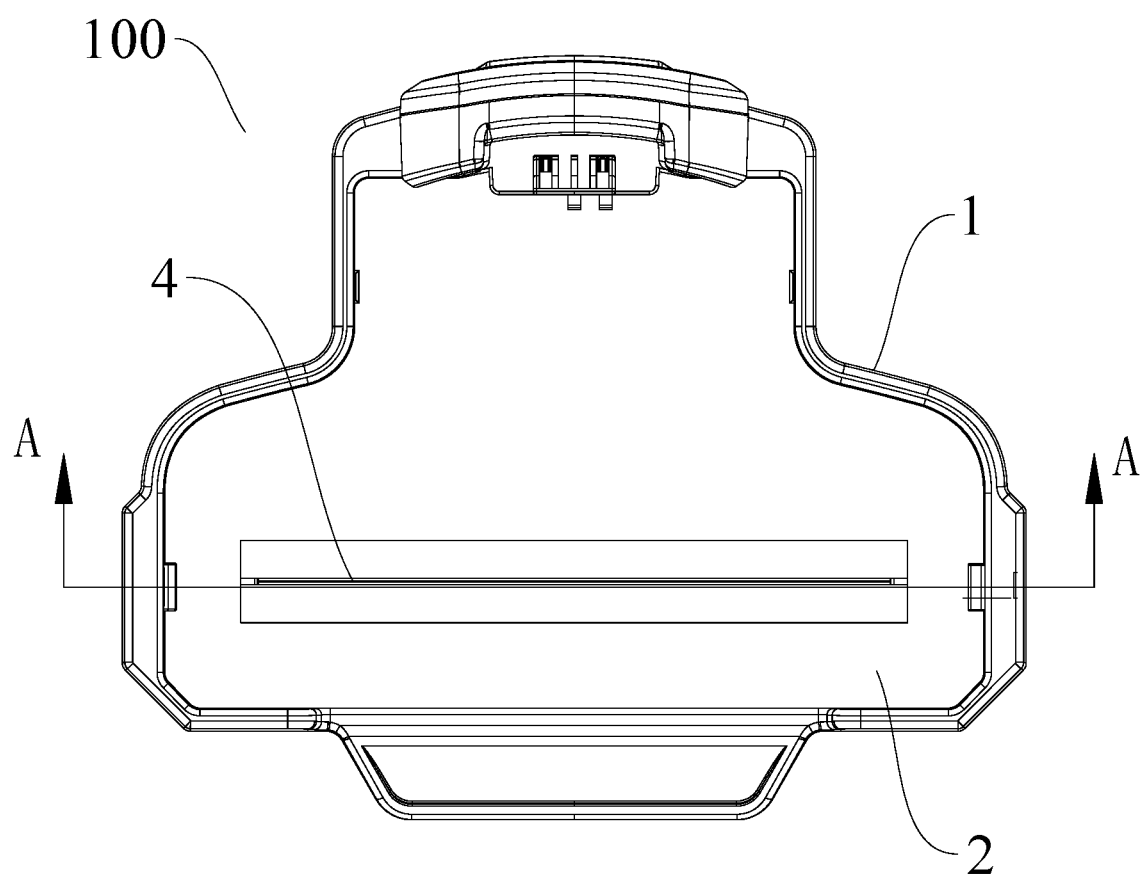
FIG. 7 is a top view of a charging stand according to another embodiment of the present disclosure.

As shown in FIGS. 1 and 7, the opening 21 extends along a left-right direction; a length direction of the blade 4 is identical to the extension direction of the opening 21 and identical to a length direction of the brushroll 201. Thus, the blade 4 can fully cut off the hairs around the brushroll 201.

Optionally, the blade 4 extends linearly along the length direction of the blade 4, as shown in FIG. 7, such that the processing is simple and the cost is low. Certainly, the blade 4 may extend curvedly along the length direction thereof, such that in the hair-cutting process, the stability of the blade 4 can be effectively ensured, and hence the hair-cutting effect of the blade 4 is better. For example, the blade 4 extends in an arc manner along the length direction thereof. For example, referring to FIG. 1 in combination with FIGS. 11 to 13, the blade 4 is bent towards a direction away from a center of the body 1. Specifically, the blade 4 deviates from a central axis of the brushroll 201 but is bent in a direction towards a center of the brushroll 201, so as to cut off the hairs wound around the brushroll 201 smoothly. Certainly, the blade 4 may extend in a wavy manner along the length direction thereof (not shown), such that the stability of the blade 4 may also be guaranteed during the hair-cutting process and the blade 4 is not easily deformed.

Figure 13:
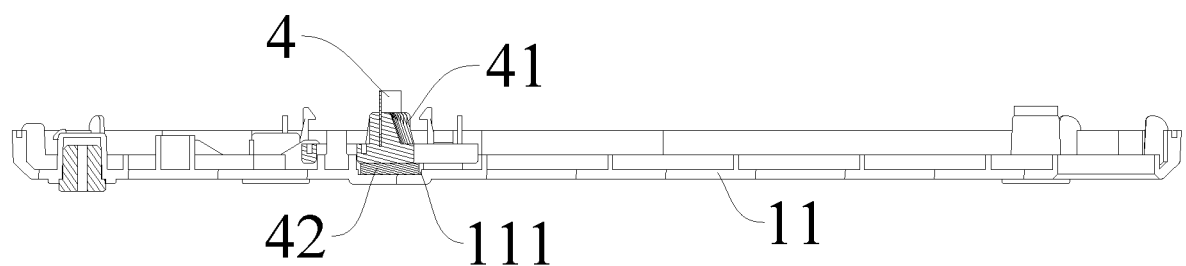
FIG. 13 is a partial schematic view of the charging stand according to an embodiment of the present disclosure.
Figure 14:
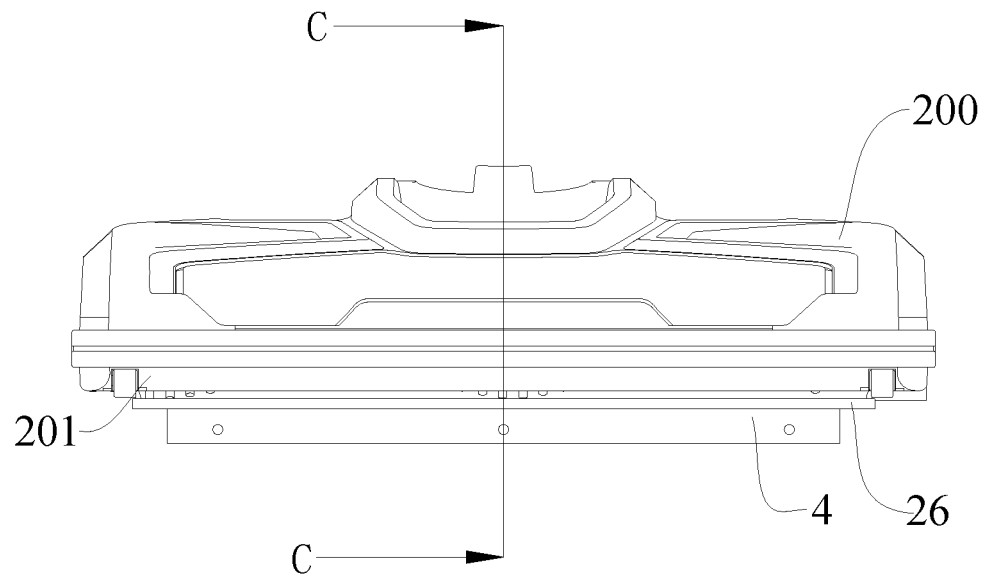
FIG. 14 is a schematic view of the vacuum cleaner, a stopping piece and the blade according to an embodiment of the present disclosure.

As shown in FIG. 13, the body 1 has a base 11, and the blade 4 is disposed on the base 11. The blade 4 is configured to cut off the hairs wound around the brushroll of the vacuum cleaner. In the hair-cutting process, the upper end of the blade 4 is in contact with a brushroll boss 202 (not shown) on the brushroll, so as to cut off the hairs around the brushroll boss 202. In such a case, the vacuum cleaner may be a rechargeable vacuum cleaner or other types of vacuum cleaners.

Referring to FIG. 13, an elastic member 42 is disposed between the blade 4 and the base 11, and optionally is made of soft rubber, but is not limited thereto. Therefore, during operation of the charging stand 100, a height of the blade 4 may be automatically adjusted by means of the elastic member 42 when the blade 4 is in over-interference contact with the brushroll boss 202 during rotation, such that the blade 4 does not come into excessive contact with the brushroll boss 202, thereby greatly reducing the accuracy of positioning the blade 4, decreasing the cost, and improving the product qualification rate.

In some embodiments of the present disclosure, as shown in FIG. 13, the charging stand 100 further includes a blade holder 41 that is disposed on the base 11. The blade holder 41 is disposed on an inner wall (a bottom wall in FIG. 2) of the base 11. The blade 4 is disposed on the blade holder 41, for example, may be inserted into the blade holder 41. Therefore, by providing the blade holder 41, the blade 4 may be mounted on the base 11 conveniently and reliably. Preferably, the blade 4 is disposed vertically, so as to cut off the hairs wound around the brushroll effectively.

The elastic member 42 is disposed between the blade 4 and the blade holder 41, and/or between the blade holder 41 and the base 11. Specifically, the elastic member 42 may be disposed only between the blade 4 and the blade holder 41, or may be disposed only between the blade holder 41 and the base 11, or may be disposed both between the blade 4 and the blade holder 41 and between the blade holder 41 and the base 11. For example, referring to FIG. 13, the elastic member 42 is disposed between the blade holder 41 and the base 11, and an upper end of the elastic member 42 is connected with a lower end of the blade holder 41.

Specifically, when the elastic member 42 is disposed between the blade holder 41 and the base 11, an accommodating groove 111 is defined in the base 11 and configured to accommodate the elastic member 42. Referring to FIG. 13, a part of the inner wall of the base 11 is recessed towards a direction away from a center of the base 11, so as to define the accommodating groove 111. Thus, the elastic member 42 may be assembled and disassembled conveniently, and the position of the elastic member 42 may be stabilized, thereby improving the overall performance of the charging stand 100.

Optionally, an upper surface of the elastic member 42 is higher than an upper surface of the base 11. Referring to FIG. 13, the upper surface of the elastic member 42 is higher than an upper surface of the bottom wall of the base 11. Thus, it is convenient to adjust the height of the blade 4.

The pedal 2 is provided with a stopping piece 26, and the opening 21 is defined in the stopping piece 26. For example, referring to FIGS. 14 to 16, the stopping piece 26 is preferably disposed adjacent to a ground brush mouth of the vacuum cleaner 200 and located below the ground brush mouth, in which case a distance between the stopping piece 26 and the ground brush mouth is relatively short. Therefore, in the hair-cutting process, the cut hairs thrown by the brushroll 201 fall on the stopping piece 26 and cannot exceed a dust suction range of the vacuum cleaner 200, such that it is possible to prevent the cut hairs from falling into any other place beyond the dust suction range of the vacuum cleaner 200 and hence avoid secondary pollution.

Optionally, the stopping piece 26 is horizontally disposed. The cut hairs falling onto the stopping piece 26 can be prevented from gathering, which facilitates suction of the hairs on the stopping piece 26 into a dust cup by the vacuum cleaner 200, thereby improving the vacuuming efficiency. In addition, materials may be saved, thereby lowering the material cost.

Figure 15:
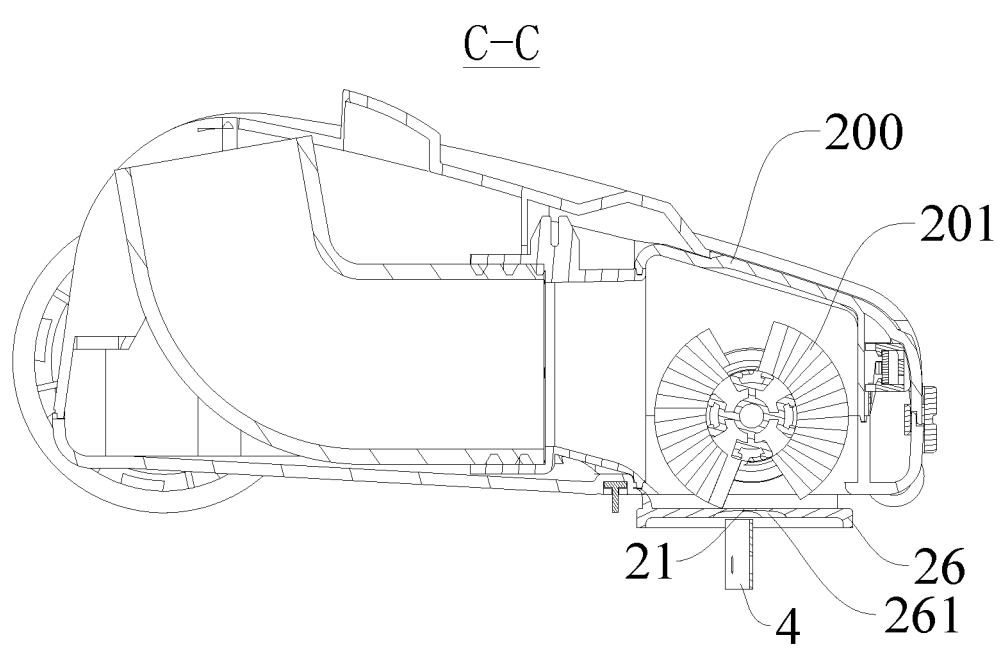
FIG. 15 is a sectional view taken along line C-C in FIG. 14.
Figure 16:
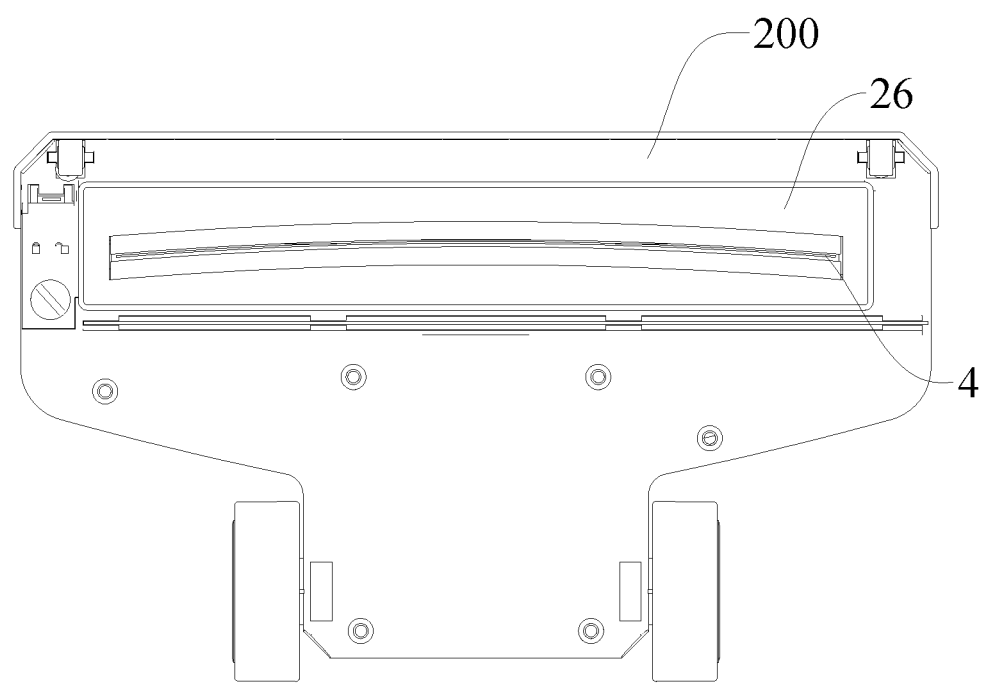
FIG. 16 is a bottom view of the vacuum cleaner, the stopping piece and the blade shown in FIG. 14.

As shown in FIG. 15, a lower surface of a part, adjacent to the opening 21, of the stopping piece 26 defines a clearance groove 261. Further, a distance between an inner wall of the clearance groove 261 and an upper surface of the stopping piece 26 is gradually decreased in a direction towards a center of the opening 21. That is, a thickness of a part of the pedal 2 adjacent to the opening 21 is gradually reduced in a direction towards the opening 21. Thus, the blade 4 can be prevented form touching the stopping piece 26, the service life of the stopping piece 26 can be prolonged, and the usage cost can be reduced. Optionally, the stopping piece 26 may be made of soft rubber, but is not limited thereto. For example, the stopping piece 26 may be made of rigid plastics, as long as the stopping piece 26 is able to guarantee that the hairs thrown by the brushroll 201 fall within the dust suction range of the vacuum cleaner 200, which will not be limited specifically.

Figure 10:
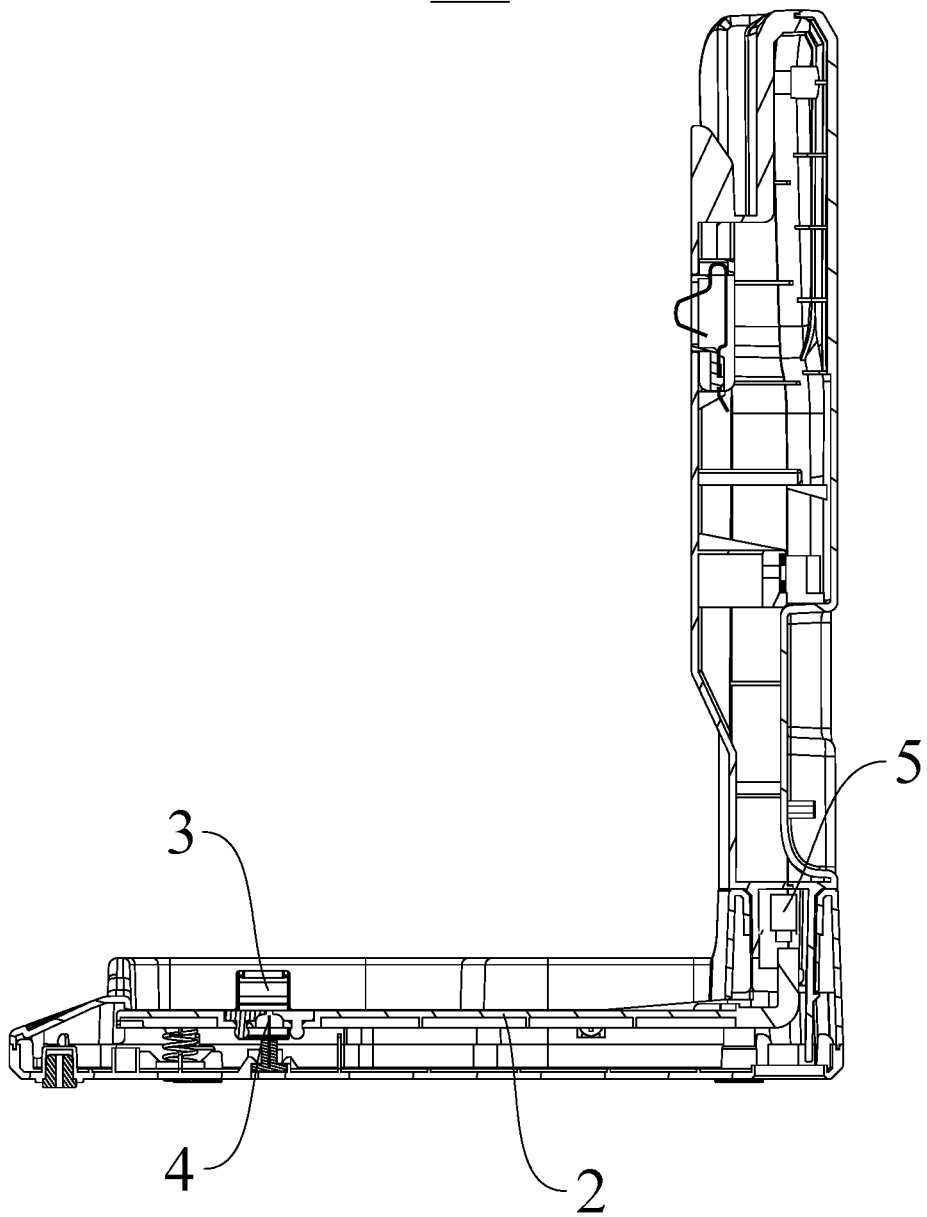
FIG. 10 is a sectional view taken along line B-B in FIG. 9.
Figure 11:
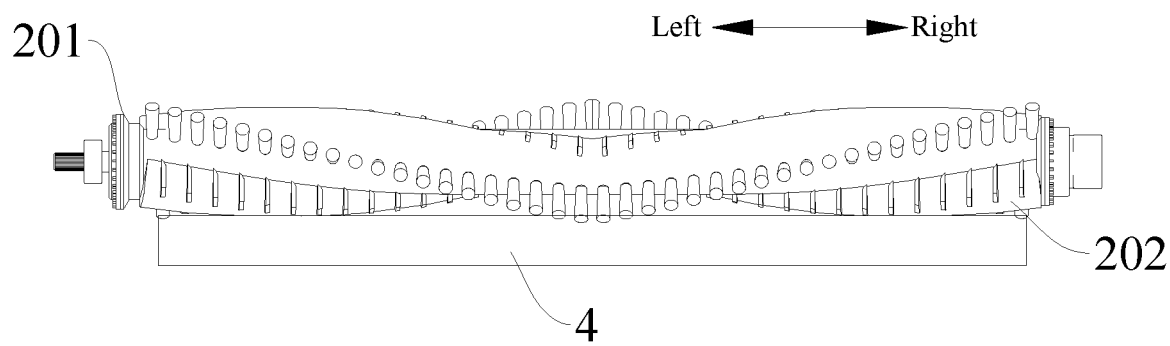
FIG. 11 is a schematic view of a blade and a brushroll according to an embodiment of the present disclosure.
Figure 12:
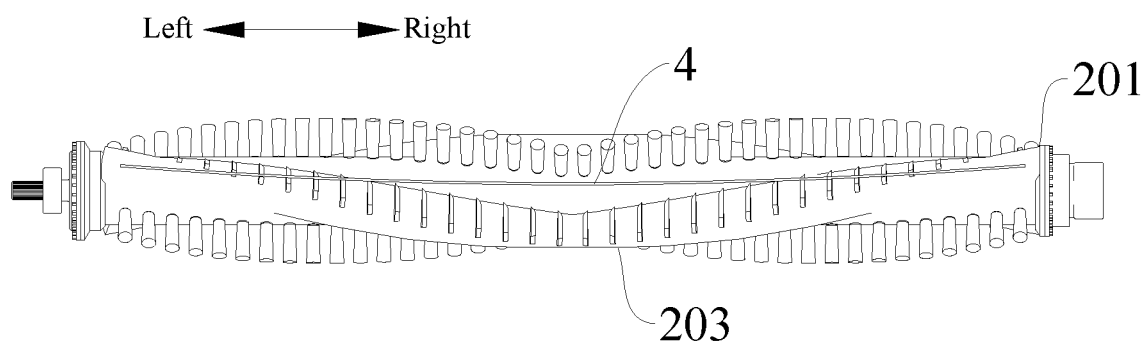
FIG. 12 is another schematic view of the blade and the brushroll shown in FIG. 11.

As shown in FIGS. 2, 3 and 10, the lower surface of the pedal 2 is provided with at least one reinforcing rib 25. For example, a plurality of reinforcing ribs 25 may be provided, and disposed to the lower surface of the pedal 2 and spaced apart evenly. Thus, the strength of the pedal 2 may be guaranteed effectively by providing the reinforcing ribs 25.

Figure 9:
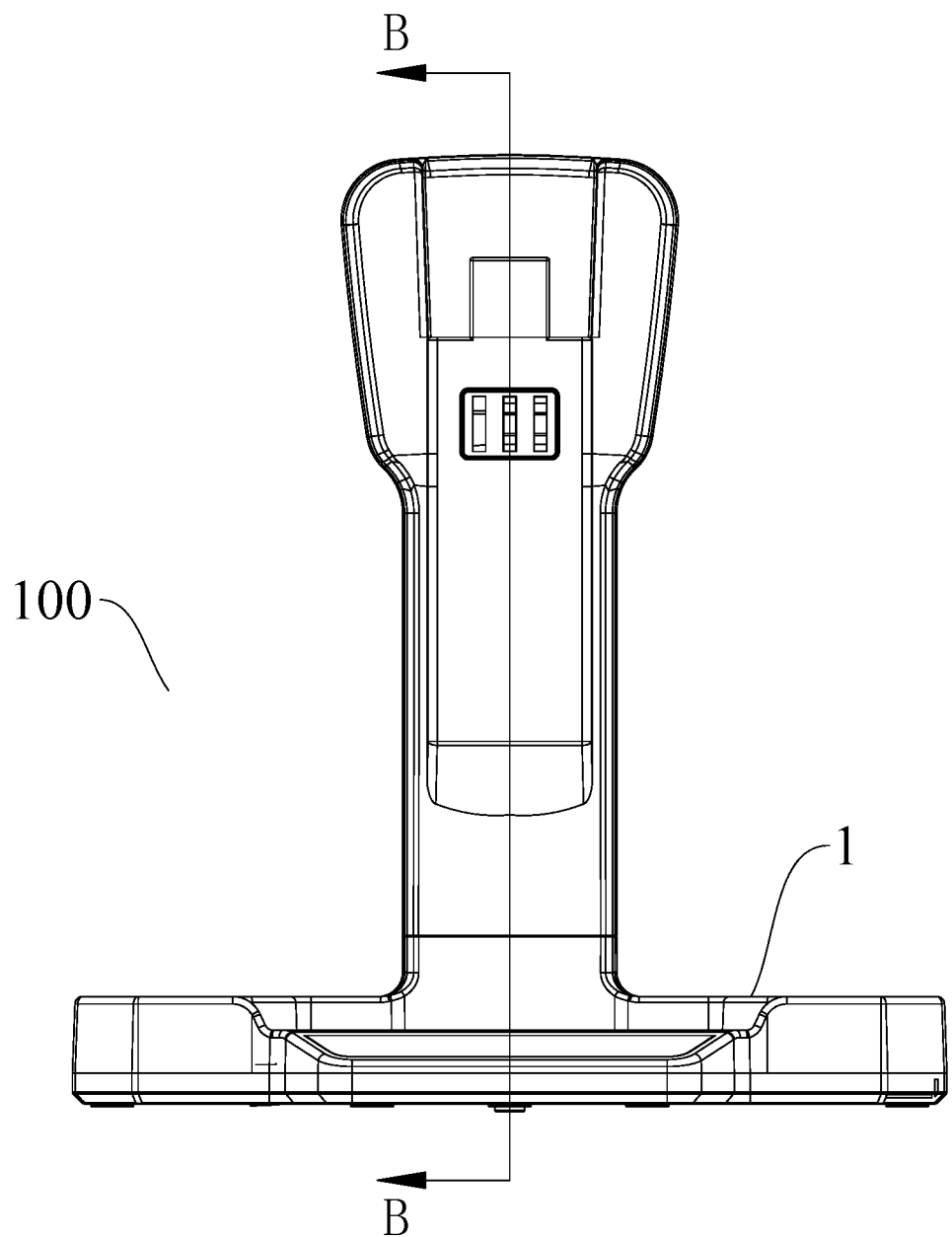
FIG. 9 is a front view of the charging stand shown in FIG. 7.

In an embodiment of the present disclosure, when the blade 4 extends out of the opening 21, the blade 4 can cut off the hairs around the brushroll 201 of the vacuum cleaner 200 placed on the pedal 2. Referring to FIG. 9 in combination with FIG. 10, the charging stand 100 further includes a microswitch 5 that is disposed within the body 1. When the pedal 2 is in the second position, the microswitch 5 is triggered to make the charging stand 100 stop charging and rotate the brushroll 201.

For example, as shown in FIG. 10, the pedal 2 is pivotably connected in the body 1 through a pivot shaft 22; the microswitch 5 is disposed at a rear portion of the charging stand 100 and located above the pedal 2. When the pedal 2 is stepped down, a rear end of the pedal 2 is tilted upwards and triggers the microswitch 5, such that the microswitch 5 may switch off the charging function of the charging stand 100 to stop charging the rechargeable vacuum cleaner placed on the pedal 2, and transmit a signal to the rechargeable vacuum cleaner to make the vacuum cleaner operate. At this time, the brushroll 201 is rotated and the blade 4 implements the hair-cutting process. It should be noted herein that the specific structure and working principle of the microswitch 5 are well known and hence will not be elaborated in detail.

In a specific embodiment of the present disclosure, as shown in FIGS. 2 to 5, the pedal 2 has a first end and a second end. The first end of the pedal 2 is pivotably connected to the body 1 through the pivot shaft 22, and an elastic resetting member 23 is provided between the second end of the pedal 2 and the body 1. The elastic resetting member 23 is configured to normally push the pedal 2 towards the first position, that is, the pedal is normally held in the first position. Optionally, the elastic resetting member 23 is configured as a spring.

For example, as shown in FIGS. 2 to 5, the pedal 2 extends along a front-rear direction. The first end of the pedal 2 is the rear end thereof, and the second end of the pedal 2 is the front end thereof. The rear end of the pedal 2 is pivotably connected to the body 1 through the pivot shaft 22 extending along the left-right direction. The spring is disposed at the front end of the pedal 2 and located between the lower surface of the pedal 2 and a bottom wall of the body 1. The spring is configured to normally push the pedal 2 upwards to keep the pedal 2 in a horizontal position.

Further, a side of the body 1 adjacent to the second end of the pedal 2 is provided with a position-limiting member 24, and the position-limiting member 24 is located at a side of the pedal 2 away from the elastic resetting member 23. For example, as shown in FIGS. 1 to 3, the position-limiting member 24 is configured as a baffle, and the baffle is disposed at a front side of the body 1 and abuts against the upper surface of the pedal 2, so as to prevent the pedal 2 from rotating upwards under the action of the spring.

Figure 4:
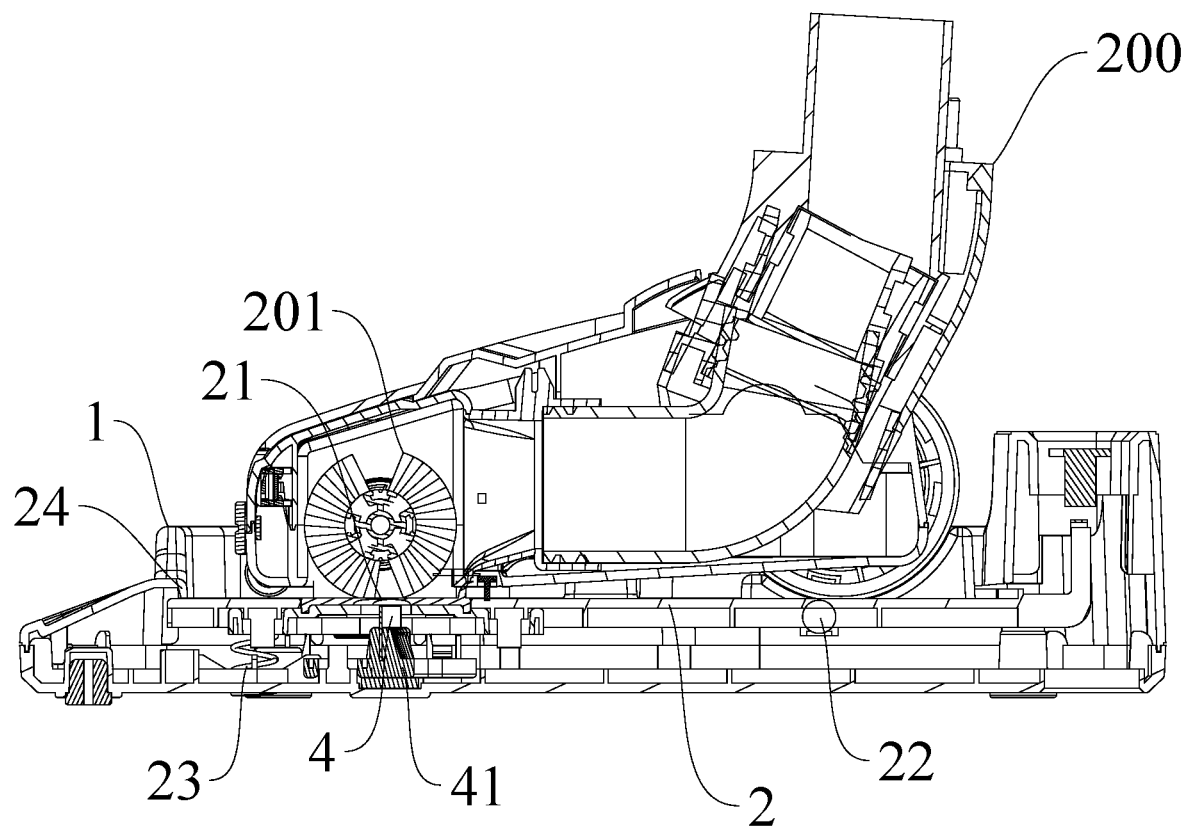
FIG. 4 is a schematic view of the charging stand and a brushroll part of the vacuum cleaner according to the embodiment of the present disclosure.
Figure 5:
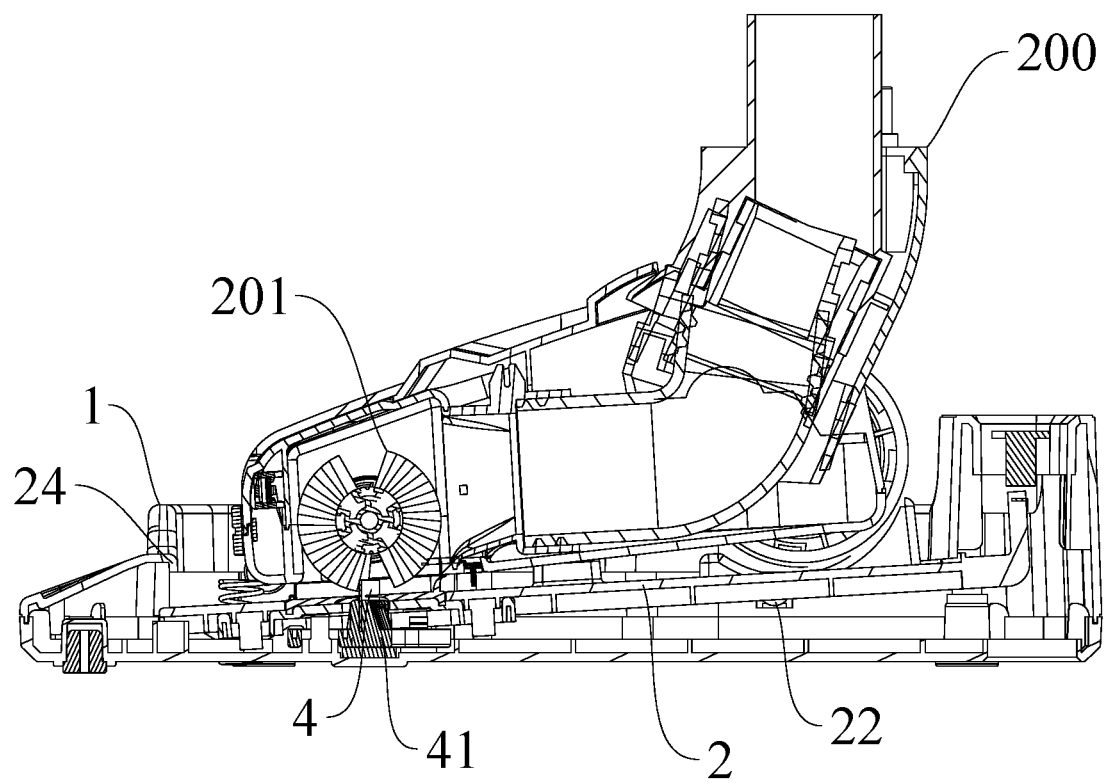
FIG. 5 is another schematic view of the charging stand and the brushroll part of the vacuum cleaner according to the embodiment of the present disclosure.

As shown in FIG. 4, when the rechargeable vacuum cleaner needs to be charged, the rechargeable vacuum cleaner may be placed on the pedal 2 of the charging stand 100 so as to be charged. When the hairs need to be cut off, after the vacuum cleaner 200 (not limited to the rechargeable vacuum cleaner in this case) is placed onto the pedal 2, a front portion of the vacuum cleaner 200 may be pressed down to drive the front end of the pedal 2 to move downwards, such that the blade 4 may extend into the opening 21 of the pedal 2, and then the vacuum cleaner 200 is actuated to rotate the brushroll 201 (for example, realized by means of the microswitch 5), thereby implementing the hair-cutting process, as shown in FIG. 5.

Therefore, by providing the charging stand 100, it is attainable to cut off the hairs automatically, that is, the user may implement the hair-cutting process without disassembling the brushroll 201, which brings great convenience to the user.

In a specific embodiment of the present disclosure, a top of the body 1 is open; the pedal is disposed within the body 1; the upper surface of the pedal 2 is lower than an upper end face of the body 1; the pedal 2 is spaced apart from the bottom wall of the body 1; an accommodating space is defined between the pedal 2 and the body 1; and the blade 4, the spring and the like may be placed in the accommodating space.

Figure 6:
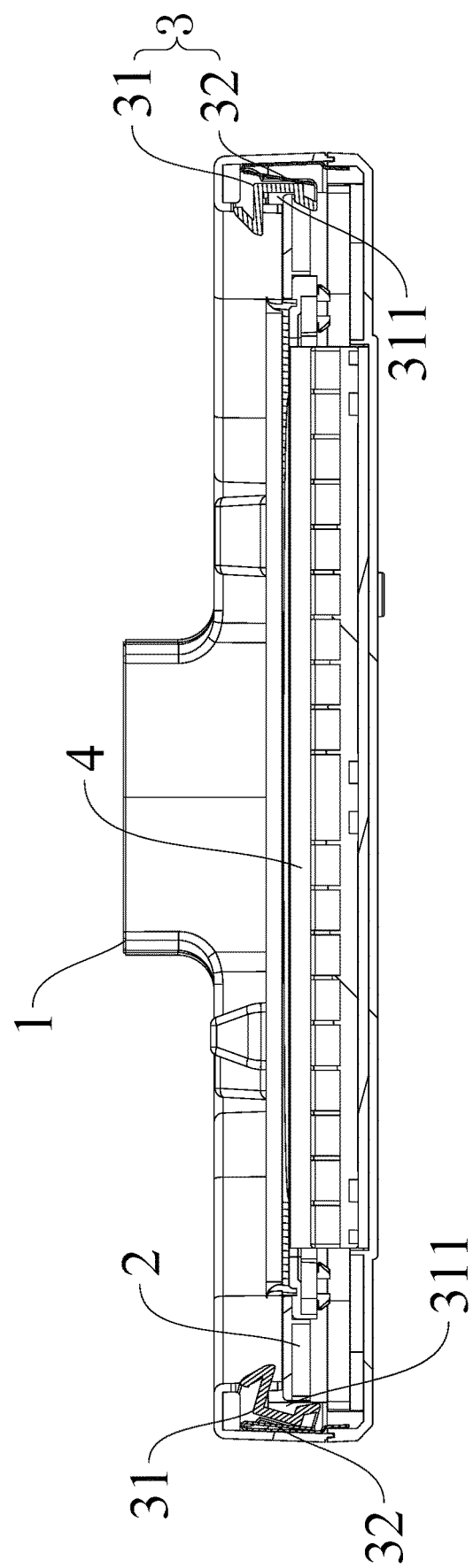
FIG. 6 is a transverse sectional view of the charging stand according to the embodiment of the present disclosure, in which a safety protection device on the left is disengaged from the pedal and a safety protection device on the right is engaged with the pedal.
Figure 8:
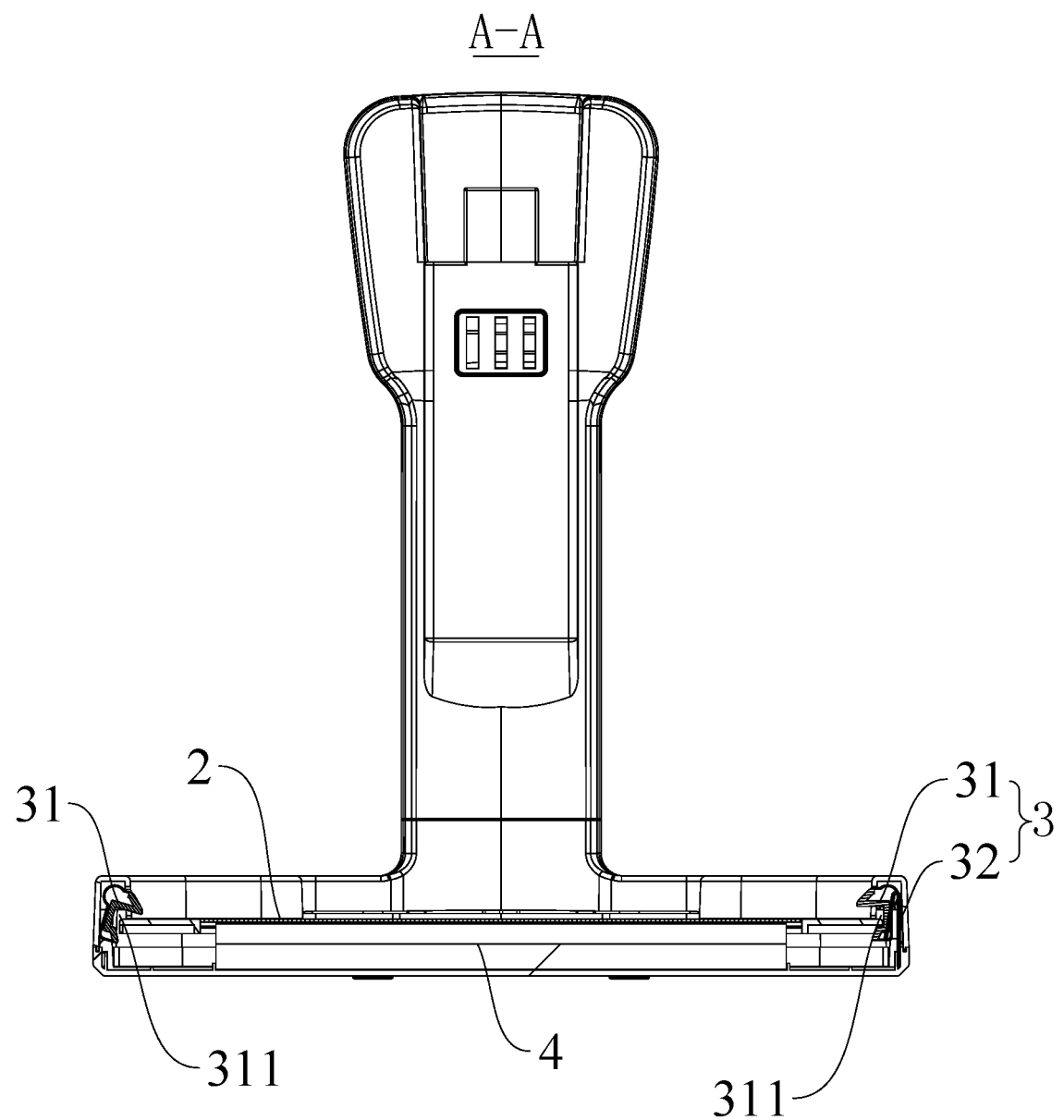
FIG. 8 is a sectional view taken along line A-A in FIG. 7.

In an embodiment of the present disclosure, as shown in FIGS. 6 to 8, each safety protection device 3 includes a safety protection member 31 and a resetting member 32. The safety protection member 31 is disposed at a side face of the pedal 2, and defines a fitting groove 311 in which an edge of the pedal 2 is fitted. The resetting member 32 is disposed between the safety protection member 31 and the body 1, and configured to normally push the safety protection member 31 towards a center of the pedal 2. Optionally, the resetting member 32 is configured as a resilient sheet or a spring. Thus, by providing the safety protection member 31, the edge of the pedal 2 may be fitted in the fitting groove 311 of the safety protection member 31, so as to prevent the pedal 2 from moving to the second position and hence prevent the blade 4 from being exposed; moreover, by providing the resetting member 32, when no external force is exerted on the safety protection member 31, the safety protection member 31 enables the edge of the pedal 2 to be fitted in the fitting groove 311 under the action of the resetting member 32, so as to play a role of safety protection.

As shown in FIG. 6, the safety protection member 31 is pivotably connected to the body 1, and has a first end (e.g. an upper end in FIG. 6) and a second end (e.g. a lower end in FIG. 6). The fitting groove 311 is defined in the second end of the safety protection member 31. When the first end of the safety protection member 31 is toggled, the second end of the safety protection member 31 moves away from the center of the pedal 2 to disengage the edge of the pedal 2 from the fitting groove 311.

In normal situations, the safety protection member 31 is vertically disposed, and a side of the fitting groove 311 towards the center of the pedal 2 is open and fitted with the edge of the pedal 2. In such a case, when the pedal 2 is stepped down, since the edge of the pedal 2 abuts against an inner wall of the fitting groove 311, the pedal 2 cannot move to the second position, i.e. the blade 4 cannot extend out of the opening 21, which improves safety. When the hairs need to be cut off, for example, the first end of the safety protection member 31 may be toggled downwards, such that the fitting groove 311 in the second end of the safety protection member 31 moves away from the pedal 2 and disengaged from the pedal 2. At this time, the pedal 2 is stepped down and hence is able to move to the second position, such that the blade 4 extends out of the opening 21 to implement the hair-cutting process.

As shown in FIG. 6, when the pedal 2 is in the first position, the first end of the safety protection member 31 extends out of an inner side face of the body 1 and is located above the pedal 2. Thus, it is convenient to toggle the first end of the safety protection member 31.

Further, the first end of the safety protection member 31 has a guide surface configured to toggle the first end of the safety protection member 31. Optionally, the guide surface is constructed to extend obliquely towards the center of the pedal 2 from up to down. For example, the guide surface is formed as an oblique plane or an oblique curved surface, extending obliquely towards the center of the pedal 2 from up to down. Thus, when the vacuum cleaner 200 is placed onto the charging stand 100 from up to down, the first end of the safety protection member 31 may be toggled downwards by a side face of the vacuum cleaner 200 along the guide surface, so as to disengage the pedal 2 from the safety protection member 31.

As shown in FIG. 7, two safety protection devices 3 are provided and located at left side and a right side of the body 1 respectively. Thus, with the two safety protection devices 3, the blade 4 may extend out of the charging stand 100 by toggling the two safety protection devices 3 simultaneously and stepping down the pedal 2, such that.

An example provided with two safety protection devices 3 is illustrated herein. When the charging stand 100 is not used for charging, the safety protection members 31 of the two safety protection devices 3 are engaged with the edges of the pedal 2 under the action of the resetting members 32, in which case even if the pedal 2 is stepped down, the pedal cannot move to the second position, i.e. the blade cannot extend out of the opening 21. Moreover, when only one safety protection device 3 is toggled and disengaged from the edge of the pedal 2, since the other safety protection device 3 is still engaged with the edge of the pedal 2, the pedal 2 still cannot move to the second position, which guarantees the safety of the charging stand 100. When the rechargeable vacuum cleaner needs to be charged or the hairs on the vacuum cleaner 200 need to be cut off, the vacuum cleaner 200 may be placed on the charging stand 100. In this process, the safety protection members 31 of the two safety protection devices 3 are toggled by the vacuum cleaner 200 to be disengaged from the pedal 2, such that the rechargeable vacuum cleaner may be charged. If the pedal 2 is stepped down and moves to the second position, the blade 4 extends out of the opening 21 of the pedal 2 to cut off hairs.

Therefore, by providing the safety protection device 3, when there is no need to perform the charging function, it is possible to avoid safety hazards when the charging stand is accidentally triggered.

The functionality of the charging stand 100 according to embodiments of the present disclosure is expanded and the safety of using the charging stand 100 is enhanced.

Other constructions and operations of the charging stand 100 according to embodiments of the present disclosure are well known to those skilled in the art, which will not be elaborated herein.

Reference throughout this specification to "an embodiment," "some embodiments," "an exemplary embodiment," "an example," "a specific example" or "some examples"

means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle and spirit of the present disclosure are acceptable. The scope of the present disclosure is defined by the claims or the like.

What is claimed is:

1. A rechargeable vacuum cleaner assembly, comprising:
   a rechargeable vacuum cleaner provided with a first magnetic member;
   a charging stand provided with a second magnetic member, wherein the first magnetic member is configured to connect with the second magnetic member through magnetic attraction so as to position the rechargeable vacuum cleaner to the charging stand;
   a pedal disposed on body of the charging stand and pivotable between a first position and a second position; and
   a safety protection device disposed on body of the charging stand and normally engaged with the pedal, wherein when the safety protection device is toggled, the safety protection device is disengaged from the pedal to make the pedal move from the first position to the second position, wherein at least two safety protection devices are provided; the at least two safety protection devices are disposed on the body and spaced apart from each other; when the at least two safety protection devices are toggled, the at least two safety protection devices are disengaged from the pedal to make the pedal move from the first position to the second position;
   wherein each safety protection device comprises:
   a safety protection member disposed at a side face of the pedal and defining an fitting groove in which an edge of the pedal is fitted; and
   a resetting member disposed between the safety protection member and the body, and configured to normally push the safety protection member towards a center of the pedal, wherein the safety protection member is pivotably connected to the body;
   wherein the safety protection member has a first end and a second end, in which the fitting groove is defined in the second end of the safety protection member; when the first end of the safety protection member is toggled, the second end of the safety protection member moves away from the center of the pedal to disengage the edge of the pedal from the fitting groove;
   wherein the first end of the safety protection member has a guide surface configured to toggle the first end of the safety protection member,
   wherein the guide surface is constructed to extend obliquely towards the center of the pedal from up to down; and
   wherein the guide surface is formed as an oblique plane or an oblique curved surface, extending obliquely towards the center of the pedal from up to down.

2. The rechargeable vacuum cleaner assembly according to claim 1, wherein the first magnetic member and the second magnetic member both are magnets.

3. The rechargeable vacuum cleaner assembly according to claim 1, wherein one of the first magnetic member and the second magnetic member is a magnet, and the other thereof is an iron member.

4. The rechargeable vacuum cleaner assembly according to claim 1, wherein when the pedal is in the first position, the first end of the safety protection member extends out of an inner side face of the body.

5. The rechargeable vacuum cleaner assembly according to claim 1, wherein the resetting member is configured as an elastic sheet or a spring.

6. The rechargeable vacuum cleaner assembly according to claim 1, wherein two safety protection devices are provided and located at a left side and a right side of the body respectively.

7. The rechargeable vacuum cleaner assembly according to claim 1, wherein the pedal is disposed horizontally when in the first position.

8. The rechargeable vacuum cleaner assembly according to claim 1, wherein a rotation angle of the pedal rotating from the first position to the second position is denoted as $\alpha$, in which $\alpha$ satisfies $0°<\alpha<60°$.

9. The rechargeable vacuum cleaner assembly according to 8, wherein $\alpha$ further satisfies $1°\leq\alpha\leq10°$.

10. The rechargeable vacuum cleaner assembly according to claim 1, wherein a top of the body is open, and the pedal is disposed within the body and spaced apart from a bottom wall of the body.

11. The rechargeable vacuum cleaner assembly according to claim 1, wherein a lower surface of the pedal is provided with at least one reinforcing rib.

12. The rechargeable vacuum cleaner assembly according to claim 1, wherein a blade is provided in the body, and an opening is defined in the pedal and corresponds to a position of the blade;
   when the pedal is in the second position, the blade extends out of the opening to cut off hairs around a brushroll of the vacuum cleaner placed on the pedal; when the pedal is in the first position, the blade is located below the opening, further comprising a microswitch disposed within the body, wherein when the pedal is in the second position, the microswitch is triggered to make the charging stand stop charging and rotate the brushroll;
   wherein the blade extends curvedly along a length direction thereof;
   wherein the blade extends in an arc or wavy manner along the length direction thereof;
   wherein the body has a base, and an elastic member is disposed between the blade and the base;
   a blade holder disposed on the base, wherein the blade is disposed on the blade holder;
   the elastic member is disposed between the blade and the blade holder and/or between the blade holder and the base;
   wherein when the elastic member is disposed between the blade holder and the base, an accommodating groove is defined in the base and configured to accommodate the elastic member; and
   wherein an upper surface of the elastic member is higher than an upper surface of the base, wherein the elastic member is made of soft rubber.

13. The rechargeable vacuum cleaner assembly according to claim 12, wherein the blade is vertically disposed.

14. The rechargeable vacuum cleaner assembly according to claim 12, wherein the pedal is provided with a stopping piece, and the opening is defined in the stopping piece, wherein the stopping piece is horizontally disposed, and wherein a clearance groove is defined in a lower surface of a part, adjacent to the opening, of the stopping piece, wherein a distance between an inner wall of the clearance groove and an upper surface of the stopping piece is gradually decreased in a direction towards a center of the opening, and wherein the stopping piece is made of soft rubber.

15. The rechargeable vacuum cleaner assembly according to claim 1, wherein the pedal has a first end and a second end, and the first end of the pedal is pivotably connected to the body through a pivot shaft;

an elastic resetting member is provided between the second end of the pedal and the body, and configured to normally push the pedal towards the first position.

16. The rechargeable vacuum cleaner assembly according to claim 15, wherein a side of the body adjacent to the second end of the pedal is provided with a position-limiting member, and the position-limiting member is located at a side of the pedal away from the elastic resetting member.

17. The rechargeable vacuum cleaner assembly according to claim 15, wherein the elastic resetting member is configured as a spring.

18. The rechargeable vacuum cleaner assembly according to claim 15, wherein the pedal extends along a front-rear direction; the first end of the pedal is a rear end thereof, and the second end of the pedal is a front end thereof.

* * * * *